Sept. 15, 1964

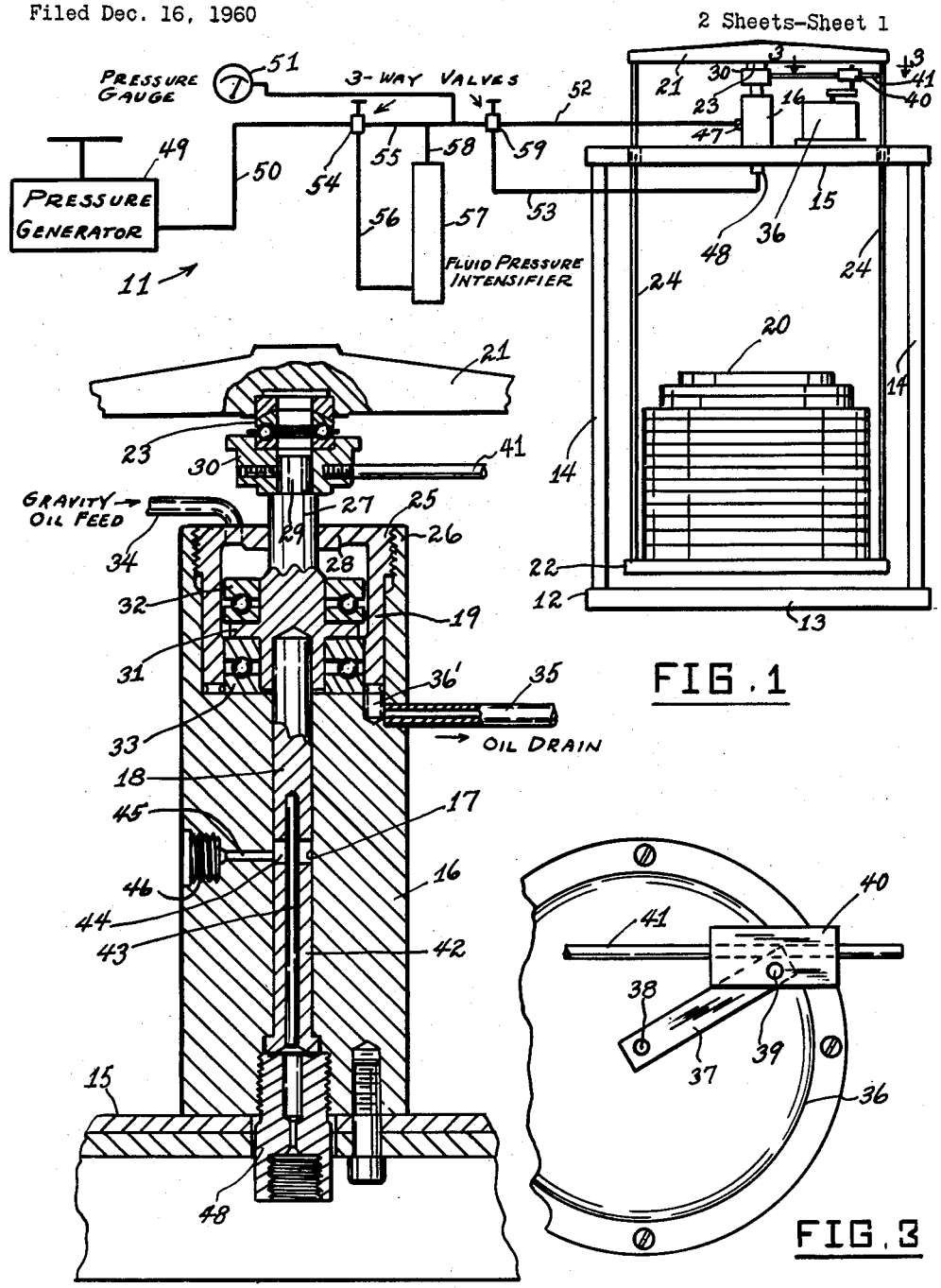

W. H. REYNOLDS 3,148,528

PRESSURE BALANCE

Filed Dec. 16, 1960

INVENTOR.
WILLIAM H. REYNOLDS

BY *Herman J. Gordon*

ATTORNEY

United States Patent Office 3,148,528
Patented Sept. 15, 1964

3,148,528
PRESSURE BALANCE
William H. Reynolds, Silver Spring, Md., assignor to American Instrument Company, Inc., Silver Spring, Md.
Filed Dec. 16, 1960, Ser. No. 76,283
10 Claims. (Cl. 73—4)

This invention relates to pressure balances, and more particularly to pressure balances for use as precision pressure gauges or for calibrating pressure gauges and transducers.

A main object of the invention is to provide a novel and improved pressure balance which is relatively simple in construction, which has a high degree of sensitivity, and which has a wide working pressure range.

A further object of the invention is to provide an improved pressure balance which is capable of measuring relatively low pressures as well as high pressures with good accuracy, which involves relatively few parts, which is rugged in construction, and which is provided with means to prevent sticking of the relatively movable elements thereof.

Further objects and advantages of the invention will become apparent from the following description and claims, and from the accompanying drawings, wherein:

FIGURE 1 is a schematic diagram showing the fluid connections of a pressure balance constructed in accordance with the present invention.

FIGURE 2 is an enlarged vertical cross-sectional view taken through the working cylinder of the pressure balance of FIGURE 1.

FIGURE 3 is an enlarged fragmentary top plan view of the oscillating motor and its driving connections, as employed in FIGURE 1, said view being taken substantially on the line 3—3 of FIGURE 1.

Figure 4:
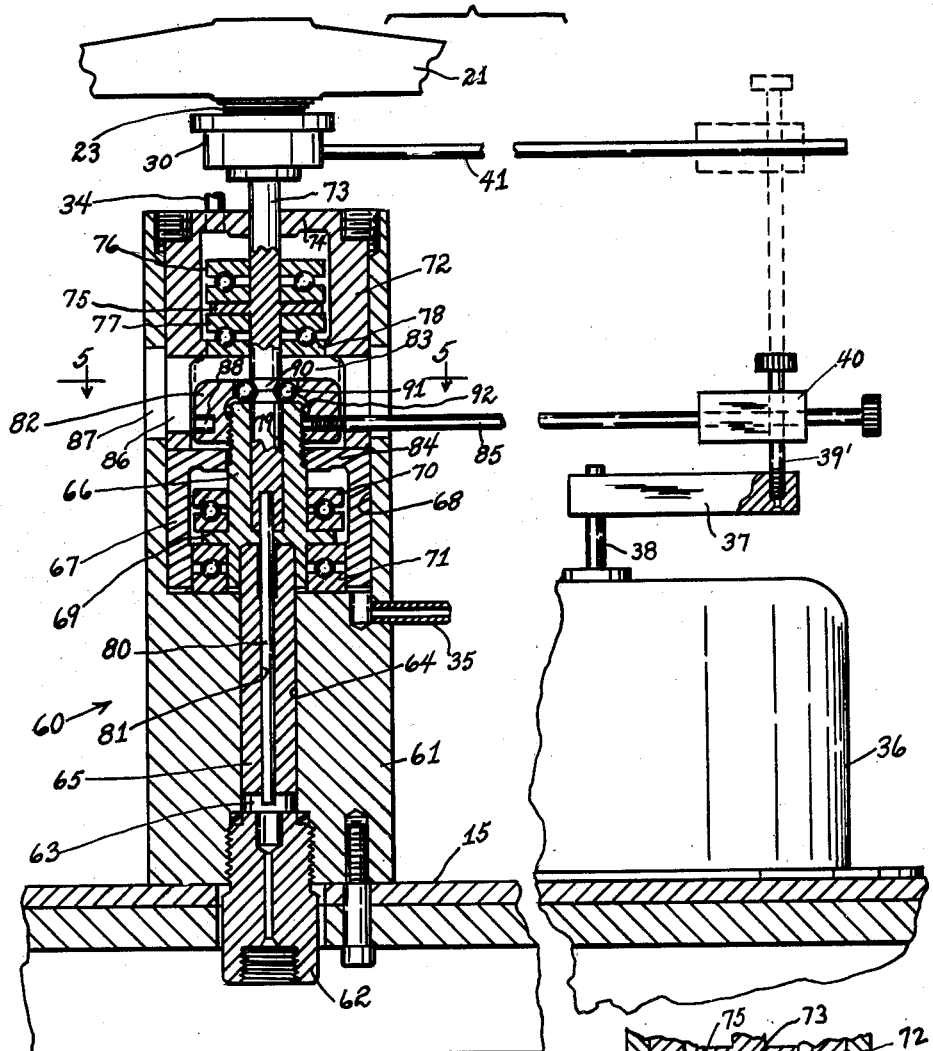
FIGURE 4 is an enlarged vertical cross-sectional view similar to FIGURE 1 but showing a modification of the improved pressure balance of the present invention.

The present invention is concerned with a pressure balance of the piston gauge type. This type of pressure balance is generally well known and is exemplified by catalogue No. 47-2911, manufactured by American Instrument Co., Inc., Silver Spring, Maryland. This instrument, which is typical of those heretofore manufactured, has a piston area of 0.01 square inch, so that a load on the piston of 1000 pounds requires a pressure of 100,000 pounds per square inch to raise it. In order to keep the weights to a reasonable value, the piston diameter is relatively small, so that it is easily bent, and therefore, in order to hold its accuracy and sensitivity, the gauge must be handled with extreme care. To assure accuracy, these gauges must be calibrated by the National Bureau of Standards, where it is possible to measure the piston diameter to the nearest 0.00001 inch, and the largest weight to the nearest 0.0001 pound. The diameter of a piston of area equal to 0.01 square inch is approximately 0.11280 inch. A relatively slight transverse blow on the top of the piston will bend it and make it useless for further measurement.

It therefore becomes necessary to hang all the weights, such as the weights 20 in FIGURE 1, from a saddle 21 and a stirrup 22 which are mounted on the top of the piston through a universal ball bearing 23, thus keeping the center of gravity of the combined mass of the saddle, stirrup and weights well below the top of the piston and in a vertical line through its geometric center. At the same time, it is necessary to restrain lateral movement of the combined mass by locating suitable stops, not shown, in strategic places.

From the above limitations it may be seen that no loading of the small piston from above may be safely accomplished, and that the mass of the saddle, with its cross arm, side rods 24 and weight pan, or stirrup, 22 heretofore has prevented the measurement of small pressures. Various schemes have been tried heretofore to eliminate the pressure effect of these moving parts, such as counterbalancing them by a series of weights and pulleys. Unless the friction of the pulleys is reduced virtually to zero, such schemes cause more errors than those they seek to eliminate.

In order for such gauges to have a low pressure range, it is necessary that the piston diameters be increased so that a given load on the piston can be raised by a comparatively low pressure. For example, if the saddle, side rods and weight pan have an aggregate weight of 50 pounds, its requires 50×100, or 5000 pounds per square inch on a 0.01 square inch area piston to raise this load. In other words, the constant of this gauge is 100.

If the piston area could be increased to 0.1 square inch, it would be capable of measuring pressures as low as 500 pounds per square inch, all other things remaining the same. A piston of 0.357 inch diameter has an area of 0.1 square inch. Because of the relatively large diameter of such a piston, it is not easily bent, and if necessary or desirable it can be loaded directly from the top, rather than through a saddle and stirrup. By eliminating the saddle and stirrup as part of the load to be lifted, the gauge may be made to weigh even lower pressures.

A combination of a large diameter piston with a small diameter piston will give a large coverage of pressure measurements in a single gauge, provided that the proper effective piston area can be selected, as required. A prime purpose of the present invention is to provide such a combination piston and means for selecting the proper effective piston area.

To prevent sticking of the piston in its cylinder, the piston must be oscillated continuously, and means, presently to be described, is provided to cause such oscillation without exerting any vertical component of the oscillating force on the gauge.

Referring to the drawings, and more particularly to FIGURES 1 to 3, 11 generally designates a pressure balance assembly according to the present invention. The assembly 11 comprises the main supporting frame 12 having the base 13, the spaced vertical standards 14, 14 secured to and rising from said base, and the horizontal top supporting bar 15 secured to the top ends of said standards. Centrally secured on the supporting bar 15 is the vertical cylinder 16 provided with the axial bore 17, of substantial diameter, in the upper portion of which is slidably and sealingly disposed the relatively large piston 18.

The top portion of cylinder 16 is recessed to receive the hollow cap member 19, which is provided with the externally threaded top rim portion 25 threadedly engaged in the internally threaded top rim portion 26 of the cylinder. A vertical shank member 27 of substantial diameter extends rotatably and slidably through the center of the top wall 28 of cap member 19 and is formed at its top end with a reduced stud portion 29 on which is secured a collar member 30. The saddle 21 is pivotally supported on the collar member 30 by the universal ball bearing assembly 23. Piston 18 is rigidly secured in the lower end portion of the shank member 27. Said lower end portion is integrally formed with a flange 31, and respective ball bearing assemblies 32 and 33 are provided above and below said flange. Cap member 19 is supplied with lubricant from a suitable gravity feed conduit 34 connected to top wall 28, the lubricant draining from the cap member through a drain conduit 35 communicating with a recess 36', which in turn communicates with the bottom of the cavity in the top portion of cylinder 16 containing cap member 19.

An electric motor 36 is vertically mounted on the horizontal support 15 and oscillates shank member 27 through a linkage comprising a horizontal arm 37 secured to the motor shaft 38, a vertical pin 39 secured to the outer end portion of arm 37, a horizontal crank block 40 slidably receiving the vertical pin 39, and a horizontal connecting rod 41 radially secured to the collar 30 and extending slidably and longitudinally through the crank block 40.

A guide sleeve 42 is fixedly mounted in the lower portion of bore 17 and slidably and sealingly receives a relatively small piston 43 axially secured to and depending from the bottom end portion of piston 18. As shown in FIGURE 2, a clearance space 44 is provided between the bottom end of piston 18 and the top end of the fixed guide sleeve 42. A radial fluid passage 45 connects space 44 to a conduit fitting recess 46 in the intermediate portion of cylinder 16 adapted to receive a conventional low pressure supply conduit fitting 47.

A high pressure conduit fitting 48 is connected axially to the bottom end of cylinder 16, communicating with the space beneath the bottom end of small piston 43.

A suitable pressure generator 49 is employed as the source of fluid pressure, said generator being provided with the output line 50. A low pressure supply line 52 is connected to the conduit fitting 47 and a high pressure supply line 53 is connected to the conduit fitting 48.

The output line 50 is connected to the inlet port of a first conventional three-way valve 54 which may be selectively operated to connect line 50 to either a conduit 55 or a conduit 56.

Conduit 56 is connected to the low pressure port of a fluid pressure intensifier 57, similar to that disclosed in U.S. Patent No. 2,628,872 to T. G. Moore. The output, or high pressure, port of the fluid pressure intensifier is connected by a conduit 58 to the conduit 55. Conduit 55 is connected to the inlet port of a second conventional three-way valve 59, which may be selectively operated to connect conduit 55 either to conduit 52 or to conduit 53.

The device 51 to be calibrated, such as a pressure gauge, transducer, or similar device, is connected to the conduit 55.

When the device 51 to be calibrated is of a low pressure type, valve 54 is adjusted to connect conduit 50 to conduit 55, and valve 59 is adjusted to connect conduit 55 to conduit 52. This connects the output of pressure generator 49 directly to the space 44 beneath the piston 18, whereby a relatively large working area is presented to the fluid, enabling the low pressure device 51 to be calibrated (by the balancing action) by the use of a reasonable number of calibrating weights 20.

When the device to be calibrated is of the high pressure type, valves 54 and 59 are adjusted to connect the pressure generator 49 to the input port of the fluid pressure intensifier 57 and to connect the output port of the fluid pressure intensifier to the conduit 53. This applies the working fluid to the bottom end of the relatively small piston 43, developing a force which is transmitted through the large piston 18 and the bearing assembly 23 to the saddle 21. Since the piston 43 is of small area, the force thus developed can be balanced by a reasonable number of calibrated weights 20.

The valve 59, as above stated, is of conventional construction, and may be provided with suitable means to respectively vent the conduits 52 and 53 to atmosphere when they are not connected to the fluid supply conduit 55.

Figure 5:
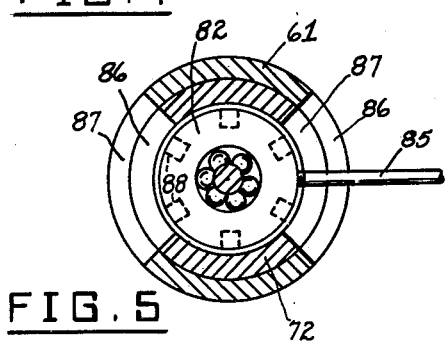
FIGURE 5 is a cross-sectional view taken substantially on line 5—5 of FIGURE 4.
Figure 6:
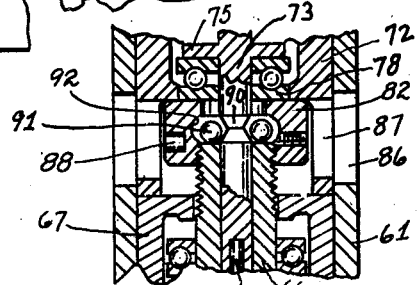
FIGURE 6 is a fragmentary cross-sectional view of a portion of the pressure balance working cylinder assembly of FIGURE 4, with the parts adjusted for high pressure operation.

Referring now to FIGURES 4, 5 and 6, a modified form of pressure balance cylinder assembly is designated generally at 60. The assembly 60 comprises a main cylinder body 61 secured centrally on the top supporting bar 15 and provided centrally at its bottom end with a fluid inlet conduit fitting 62 adapted to be connected to the outlet of a suitable source of working fluid under pressure, to which is also connected the device to be calibrated, corresponding to the device 51 in FIGURE 1.

Conduit fitting 62 communicates with the bottom space 63 in an axial bore 64 in body 61. Slidably and sealingly mounted in bore 64 is a relatively large piston 65 whose top end is rigidly secured in a bushing member 66 disposed in an annular cap member 67 mounted in the bottom of a cylindrical recess 68 formed in the upper portion of body 61.

Bushing member 66 is integrally formed with a peripheral flange 69, and respective ball bearing assemblies 70 and 71 are provided above and below said flange.

An annular hollow plug member 72 is secured in the top portion of recess 68. A shank member 73 extends axially and slidably through the top wall 74 of plug member 72 and is rigidly secured at its top end to the collar 30. Shank member 73 is integrally formed with an annular flange 75 disposed in the plug member 72, and respective ball bearing assemblies 76 and 77 are provided above and below flange 75, the bottom race 78 of the lower bearing assembly 77 being rigidly secured in the lower end of plug member 72 so as to define a bottom wall for said plug member.

The lower end portion of shank member 73 is loosely and slidably received in an axial bore 79 provided in the upper portion of bushing member 66. A relatively small piston member 80 is rigidly secured axially to the bottom end portion of shank member 73 and extends slidably and sealingly through an axial bore 81 provided in the large piston 65, being exposed at its bottom end to the space 63.

An annular nut member 82 is threadedly engaged on the top end portion of the sleeve-like bushing member 66, being thus disposed in the space 83 between the fixed race element 78 and the top wall 84 of cap member 67. Nut member 82 may be locked in a first position on bushing member 66, such as that shown in FIGURE 4, by a horizontal, radially extending rod member 85 which is threadedly engaged through the wall of the nut member 82 and clampingly engages the bushing member 66, as shown, so that the rod member 85 may be employed to oscillate the large piston 65 in a manner presently to be described, while substantially upward clearance is provided above the nut member 82 to allow piston 65 to be elevated by the working fluid.

Opposing, relatively large registering apertures 86, 87 are provided in the walls of members 72 and 61 adjacent the nut member 82. Said nut member is further provided with spaced peripheral recesses 88 to receive a suitable tool inserted through apertures 86, 87 to at times rotate the nut member relative to the bushing member 66, so that the nut member may be adjusted in position, for example, may be adjusted from the position of FIGURE 4 to the position of FIGURE 6 when the rod member 85 is removed.

In the position of nut member 82 shown in FIGURE 4, namely, with substantial clearance space provided above the nut member in the space 83, the apparatus may be employed to calibrate a low pressure range device, since the force developed by a relatively low working fluid pressure in space 63 is sufficient to balance a reasonable number of calibrated weights 20, due to the relatively large effective piston area in said space.

When the nut member 82 is adjusted to the position shown in FIGURE 6, said nut member is in abutment with the top wall of space 83, defined by fixed race member 78 and the adjacent portion of cup member 72, preventing any upward movement of large piston 65. However, small piston 80 may be moved upwardly by the working fluid, and where the device to be calibrated is of the high pressure type, the high pressure working fluid acting on the small piston 80 will develop a sufficiently small force to be balanced by a reasonable number of calibrated weights 20.

In the low pressure setting of FIGURE 4, the piston 65 is oscillated by rod 85, which extends slidably through a block 40, which in turn is pivotally secured to the free end of crank arm 37 by a removable vertical connecting pin 39'.

In the high pressure setting, shown in FIGURE 6, the rod 85 is removed and the block 40 is slidably engaged on the upper rod member 41, as shown in dotted view in FIGURE 4. The rod member 85 may be employed as a vertical connecting pin in place of the short pin 39', whereby to pivotally connect block 40 to crank arm 37, or a separate vertical connecting pin may be employed.

A suitable bearing assembly is provided with the shank member 73 to support same against lateral deflection when the small piston 80 is elevated by the high pressure working fluid. Thus, the shank member 73 is annularly grooved adjacent the top end of bushing member 66, as shown at 90, and bearing balls 91 are provided on said top end, the nut member 82 being internally annularly recessed, as shown at 92 to provide clearance for the bearing balls 91 as shank member 73 rises by the force developed by the action of the high pressure working fluid on the small piston 80. As will be seen from FIGURE 6, upward movement of shank member 73 similarly elevates the annular recess 90, but the recess 92 allows the bearing balls 91 to move outwardly as they engage the unrecessed portion of said shank member. Said bearing balls thus rotatably support the shank member against lateral bending while elevated by the high pressure and allow the shank member and the small piston 80 to be oscillated by rod 41 under these conditions, to prevent the elements 73 and 80 from sticking.

While certain specific embodiments of an improved pressure balance apparatus have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a fluid pressure balance, a working cylinder, a large piston in said cylinder, a shank member slidably engaged in an end of the cylinder and being aligned with said large piston, means to transmit force from the large piston to the shank member, a small piston secured to said shank member and being substantially smaller in diameter than said shank member, said small piston extending slidably through said large piston, means to simultaneously apply a calibrated load to said pistons, means to furnish working fluid under pressure to said cylinder in a manner to simultaneously develop forces on said pistons opposing said load, and means to at times lock the large piston against movement in said cylinder, whereby to limit the effective transmission of force from said working fluid against the load to said small piston.

2. In a fluid pressure balance, a working cylinder, a large piston in said cylinder, a shank member slidably engaged in an end of the cylinder and being aligned with said large piston, means to transmit force from the large piston to the shank member, a small piston secured to said shank member and being substantially smaller in diameter than said shank member, said small piston extending slidably and coaxially through said large piston, means to simultaneously apply a calibrated load to said pistons, means to furnish working fluid under pressure to said cylinder in a manner to simultaneously develop forces on said pistons opposing said load, stationary abutment means in said cylinder, and an abutment element adjustably mounted on said large piston and being adjustable axially relative to said large piston to a position engaging said abutment means to lock the large piston against movement in said cylinder, whereby to limit the effective transmission of force from said working fluid to the load to said small piston.

3. In a fluid pressure balance, a vertical working cylinder, a large piston in said cylinder, a shank member slidably engaged in an end of the cylinder and being aligned with said large piston, means to transmit force from the large piston to the shank member, a small piston secured to said shank member and being substantially smaller in diameter than said shank member, said small piston extending slidably and coaxially through said large piston, means to simultaneously apply a calibrated load from above onto said pistons, means to furnish working fluid under pressure to said cylinder below said pistons in a manner to simultaneously develop upward forces on said pistons opposing said load, and means to at times lock the large piston against upward movement in said cylinder, whereby to limit the effective transmission of force from said working fluid against the load to said small piston.

4. In a fluid pressure balance, a vertical working cylinder, a large piston in said cylinder, a shank member slidably engaged in an end of the cylinder and being aligned with said large piston, means to transmit force from the large piston to the shank member, a small piston secured to said shank member and being substantially smaller in diameter than said shank member, said small piston extending slidably and coaxially through said large piston, means to simultaneously apply a calibrated load from above onto said pistons, means to furnish working fluid under pressure to said cylinder below said pistons in a manner to simultaneously develop upward forces on said pistons opposing said load, stationary abutment means in said cylinder, and an abutment member threadedly engaged on said large piston and being adjustable relative to the large piston to a position engaging said stationary abutment means to lock the large piston against upward movement in said cylinder, whereby to limit the effective transmission of force from said working fluid against the load to said small piston.

5. In a fluid pressure balance, a vertical working cylinder, a large piston in said cylinder, a shank member slidably engaged in an end of the cylinder and being aligned with said large piston, means to transmit force from the large piston to the shank member, a small piston secured to said shank member and being substantially smaller in diameter than said shank member, said small piston extending slidably and coaxially through said large piston, means to simultaneously apply a calibrated load from above onto said pistons, means to furnish working fluid under pressure to said cylinder below said pistons in a manner to simultaneously develop upward forces on said pistons opposing said load, stationary abutment means in said cylinder above said large piston, and an abutment nut threadedly engaged on the top portion of said large piston and being adjustable upwardly relative to the large piston to at times engage said stationary abutment means and to lock the large piston against upward movement in said cylinder, whereby to limit the effective transmission of force from said working fluid against the load to said small piston.

6. In a fluid pressure balance, a vertical working cylinder having a top wall portion, a vertical shank member extending slidably and axially through said top wall portion, a vertical large piston in said cylinder axially aligned with and below said shank member, means to transmit upward force from said large piston to said shank member, a small piston substantially smaller in diameter than and rigidly secured to said shank member and extending slidably and axially through said large piston, means to apply a calibrated load to the top end of said shank member, means to furnish working fluid under pressure to said cylinder below said pistons to simultaneously develop lifting forces on said pistons opposing said load, and means to at times lock the large piston against upward movement in said cylinder, whereby to limit the effective transmission of force from said working fluid against the load to said small piston.

7. In a fluid pressure balance, a vertical working cylinder having a top wall portion, a vertical shank member extending slidably and axially through said top wall portion, a vertical large piston in said cylinder axially aligned with and below said shank member, means to transmit upward force from said large piston to said shank member, a small piston substantially smaller in diameter than and rigidly secured to said shank member and extending slidably and axially through said large piston, means to apply a calibrated load to the top end of said shank member, means to furnish working fluid under pressure to said cylinder below said pistons to simultaneously develop lifting forces on said pistons opposing said load, stationary abutment means in said cylinder, and an abutment element adjustably mounted on said large piston and being adjustable to a position engaging said abutment means to lock the large piston against upward movement in said cylinder, whereby to limit the effective transmission of force from said working fluid against the load to said small piston.

8. In a fluid pressure balance, a vertical working cylinder having a top wall portion, a vertical shank member extending slidably and axially through said top wall portion, a vertical large piston in said cylinder axially aligned with and below said shank member, a bushing member secured on the large piston and receiving said shank member to transmit upward force from said large piston to said shank member, a small piston substantially smaller in diameter than and rigidly secured to said shank member and extending slidably and axially through said large piston, means to apply a calibrated load to the top end of said shank member, means to furnish working fluid under pressure to said cylinder below said pistons to simultaneously develop lifting forces on said pistons opposing said load, stationary abutment means in said cylinder, and an abutment element adjustably mounted on said bushing member and being adjustable to a position engaging said abutment means to lock the large piston against upward movement in said cylinder, whereby to limit the effective transmission of force from said working fluid against the load to said small piston.

9. The structure of claim 8, and wherein said abutment element is threadedly engaged on said bushing member.

10. In a fluid pressure balance, a vertical working cylinder having a top wall portion, a vertical shank member extending slidably and axially through said top wall portion, a vertical large piston in said cylinder axially aligned with and below said shank member, a bushing member secured on the large piston and receiving said shank member to transmit upward force from said large piston to said shank member, a small piston substantially smaller in diameter than and rigidly secured to said shank member and extending slidably and axially through said large piston, means to apply a calibrated load to the top end of said shank member, means to furnish working fluid under pressure to said cylinder below said pistons to simultaneously develop lifting forces on said pistons opposing said load, stationary abutment means in said cylinder, an abutment nut threadedly engaged on said bushing member and being adjustable to a position engaging said abutment means to lock the large piston against upward movement in said cylinder, whereby to limit the effective transmission of force from said working fluid against the load to said small piston, and an oscillating rod threadedly engaged in the abutment nut and being lockingly engageable with said bushing member.

References Cited in the file of this patent
UNITED STATES PATENTS

| | | |
|---|---|---|
| 239,127 | Wellman | Mar. 22, 1881 |
| 1,154,018 | Hopkins | Sept. 21, 1915 |
| 1,452,485 | Tanner | Apr. 17, 1923 |
| 2,766,612 | Michels | Oct. 16, 1956 |